Dec. 11, 1928.
W. J. SHACKELTON
1,695,032
IMPEDANCE MEASURING BRIDGE
Filed Oct. 16, 1925
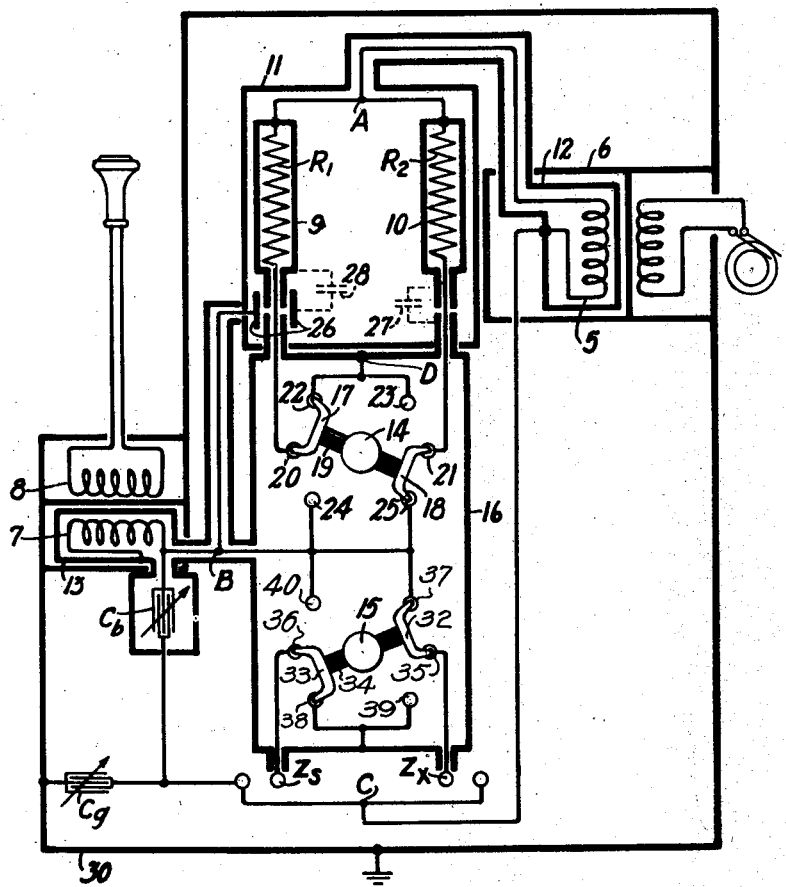
Inventor:
William J. Shackelton.
by E. W. Adams, Atty.

Patented Dec. 11, 1928.

1,695,032

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

IMPEDANCE-MEASURING BRIDGE.

Application filed October 16, 1925. Serial No. 62,816.

This invention relates to electric bridges and particularly, shielded bridges for measuring inductance and capacity, and has for an object to improve the construction of such bridges.

One arrangement used for measuring inductance and capacity is a modification of the Wheatstone bridge in which the unknown impedance constitutes one arm and a known impedance another. The ratio arms may consist of resistance, inductance or capacity. Although this invention is not limited to that particular type of bridge, the specific embodiment herein shown and described, employs non-inductive resistance ratio arms.

All of the elements of the bridge have quite appreciable surface dimensions and hence when exposed (at finite separations) to each other or to ground having corresponding direct and ground capacities. In practical embodiments, the parts, particularly those subject to manipulation, must be arranged compactly and conveniently to the operator. This prevents the possibility of making the capacity values between parts and between them and ground negligibly small. Such of these capacities as exists between points of the circuit having different electrical potentials permit the flow of current, the value of which depends in each instance upon the magnitude of the capacities, the value of the potential and the frequency.

Some of the currents flowing in paths provided by the capacities may complete their circuits external to the bridge while others may flow through symmetrical capacities and so not affect the bridge balance. However, there are many currents flowing unsymmetrically in parts of the bridge which affect the potential distribution of the bridge and therefore the impedance balance. In order to prevent this action, it is the practice to shield the various parts of the bridge arranging the shielding so as to concentrate the distributed capacities at definite bridge points and to fix the values of the capacities, and where necessary to provide additional capacities to effect the balance.

Since the balance condition of the bridge is not determined wholly by the test and standard impedances but is influenced by the admittances shunting these arms, it is very desirable to be able to reverse the impedance arms as a check on the equality of the shunt admittances. Also, as in the case of direct current bridges, it is desirable to be able to check the exact equality of the ratio arms by reversal. In fact due to the appreciable effect that a relatively small capacitative unbalance may have, it is even more desirable to be able to make this reversal in the case of alternating current bridges, particularly as capacity unbalance may arise from some factor present only when the arms are in the circuit and hence cannot be checked by preliminary tests.

One particular object of this invention is to provide means for reversing the ratio and impedance arms.

In reversing the impedance arms it is essential that none of the inherent bridge admittances should be disturbed. That is, only the unknown impedance and the standard as read should be transferred. On the other hand, in reversing the ratio arms, not only should the resistance element of these be transferred but also all associated shunt admittances. Moreover, in transferring these admittances, they must be absolutely unchanged. Further, this ratio arms reversal must not occasion a shifting of any capacitances shunting the impedance elements. The reversing arrangement must satisfy these requirements.

The arrangement of this invention by which these reversals are accomplished is best understood by reference to the drawing which shows schematically one embodiment of the invention.

The bridge shown in the drawing employs two equal non-inductive resistances $R_1$ and $R_2$ connected in the two ratio arms, and terminals $Z_s$ and $Z_x$ for the standard and test impedance, respectively, in the other two arms. Connected between the bridge terminals A and C at the junction of the ratio and impedance arms, respectively, is the winding 5 of the current supply transformer 6. The primary winding 7 of the detector transformer 8 is connected across the opposite bridge terminals B and D. Shielding is provided for the bridge elements as is the usual practice, and the primaries of the two transformers are shielded. This shielding does not affect the transformer action and permits the use of any desirable source of current or type of detector without disturbing the capacitance balance of the bridge. One terminal of the detector transformer winding is connected to its shield 13 which forms the bridge terminal D, thus concentrating the capacity at that point. Similarly, the current supply transformer winding 5 has one terminal connected to its shield 12 which is in turn connected to the bridge terminal C. Individual shields 9 and 10 are placed around the ratio arms $R_1$ and $R_2$ and connected to their junction point at the bridge terminal A. Both of these shields are in turn surrounded by a common shield 11 which also shields the lead from the terminal A to the current supply transformer primary and is connected to the shield 12 surrounding it. In this way, the capacities between the individual ratio arm shields and the shield surrounding them is directly connected between the bridge terminals A and C so that they do not affect the bridge balance.

A shielded standard impedance is used, the shield being connected to the junction point C. In this way, all of the ground capacities are concentrated at the junction points D and C. The value of the ground capacities at these points is fixed by means of a grounded shield 30 surrounding the entire bridge. To accomplish the required balance of the bridge, condenser $C_b$ is connected between the junction points B and C. This condenser is adjusted to equal the series value of the ground capacitance from C and D. Another condenser $C_x$ is connected between the junction point C and the shield 30 to control the ground capacity of that point.

In accordance with this invention, instead of connecting the ratio and impedance arm permanently in the bridge circuit, two switches 14 and 15 are provided for reversibly associating the arms in the bridge. These switches are mounted in the shield 16 which is connected to the oscillator transformer shield 13. The switch 14 which operates to reverse the ratio arms comprises two contact arms 17 and 18 mounted on an insulated rotating arm 19. These contact arms 17 and 18 connect the contacts 20 and 21 which are connected to the ratio arms $R_1$ and $R_2$, respectively, to the contact points 22 and 25, respectively, when the switch is in one position and to the contact points 24 and 23, respectively, when the switch is in the other position. Two of the switch contacts 22 and 23 are connected to the switch shield so that one ratio arm or the other, depending upon the position of the switch, is connected to the bridge terminal D. The other contact points 24 and 25 are connected to the bridge terminal B to correspondingly associate the other ratio arm in the opposite bridge arm.

Between the ratio arm shields 9 and 10 and the shields surrounding the leads from the ratio arms to the switch contacts 20 and 21, which shields are connected to the switch shield, there exist capacities the resulting parallel combination of which is represented by the dotted condenser 27. These capacities in parallel are effectively connected between the bridge terminals A and D thus shunting the ratio arm connected between these terminals. When the ratio arms are reversed, this shunt capacity is not carried with the arm but is transferred from one to the other. It is therefore necessary to provide a capacity which will shunt the opposite ratio arm. For this purpose a sleeve 26 is provided around the shield 9 and is connected to the terminal B. Capacity between this sleeve and the ratio arm shield is represented by the dotted condenser 28 and is effectively in shunt to the ratio arm connected between the terminals A and B. This capacity is adjusted, by sliding the sleeve to the same value as that of the capacity 27.

The switch 15 is similar in construction to switch 14 being comprised of contact arms 32 and 33 mounted on the insulated rotating arm 34. In the position shown in the drawing the contact arms connect contacts 35 and 36 which are connected to $Z_x$ and $Z_s$, the test and standard impedances, respectively, to contacts 37 and 38 which connect $Z_x$ to the bridge terminal B and $Z_s$ to the bridge terminal C. In the other position the contact arms connect contacts 35 and 36 to contacts 39 and 40, respectively, thereby connecting $Z_x$ to the bridge terminal C and $Z_s$ to the bridge terminal B.

All capacitances between the various parts of the switches which are subject to change due to physical movement of the switch parts are either short circuited or connected across opposite bridge points and hence do not affect the bridge balance.

What is claimed is:

1. In a four terminal measuring bridge, two ratio arms each having a terminal connected to one of a pair of terminals of said bridge, a shield for each of said arms, said shields being connected to said terminals of said arms, switching means for reversibly connecting the other terminals of said ratio arms to the other pair of terminals of said bridge, a shield for said switching means, a connection between said switch shield and one terminal of said other pair, and an effective capacity substantially equal to the capacity between said ratio arm shields and said switch shield connected between said ratio arms shield and the other terminal of said other pair.

2. In an impedance measuring bridge comprising two ratio arms and two impedance arms, shielding means for said bridge, switching means for reversing said ratio arms and switching means for reversing said impedance arms while maintaining said shielding means effective for both positions of said ratio arms and said impedance arms.

3. In a four-terminal impedance measuring bridge, two ratio arms each having a terminal connected to one of a pair of terminals of said bridge, two impedance arms each having a terminal connected to the other bridge terminal of said pair, a shield for each of said ratio arms, said shields being connected to said terminals of said arms, a shield surrounding both of said ratio arm shields and being connected to said other terminal of said pair, a transformer winding connected to said pair of bridge terminals, a shield for said winding connected to said terminal connected to said impedance arms, a second transformer winding connected to the other pair of terminals of said bridge, a shield for said winding connected to one of said latter pair of terminals, switching means for reversibly connecting the opposite terminals of said ratio arms with said latter pair of bridge terminals, switching means for reversibly connecting the opposite terminals of said impedance arms to said latter pair of bridge terminals, a shield for said switching means, said shield being connected to said second transformer winding shield, and a shield surrounding said bridge.

4. A combination according to claim 3 and an effective capacity connected between the terminal connected to said ratio arms and the other terminal of said latter pair of bridge terminals, said capacity having a value equal to the capacitance between the ratio arm shields and the switching means shield.

5. A combination according to claim 3 and a source of potential inductively associated with said first transformer winding and a detector inductively associated with said second transformer winding.

6. An alternating current impedance bridge comprising ratio arms, impedance arms, shielding means for making the balance of the bridge substantially independent of the capacities between parts thereof and means for interchanging the ratio arms and at the same time effectively transferring all associated shunt admittances.

In witness whereof, I hereunto subscribe my name this 6th day of October, A. D. 1925.

WILLIAM J. SHACKELTON.